United States Patent [19]

Little et al.

[11] 4,263,892

[45] Apr. 28, 1981

[54] HEAT SENSING MEANS, PARTICULARLY FOR SOLAR WATER HEATING APPARATUS

[76] Inventors: Frederick A. Little; David C. Little, both of 35 Second Ave., Mount Isa, Queensland 4825, Australia

[21] Appl. No.: 946,395

[22] Filed: Sep. 27, 1978

[30] Foreign Application Priority Data

Sep. 29, 1977 [AU]  Australia ............................ PD1865

[51] Int. Cl.³ .............................................. F24J 3/02
[52] U.S. Cl. .................................... 126/424; 126/438
[58] Field of Search ............... 126/424, 425, 450, 452, 126/438; 353/3; 60/641

[56] References Cited

U.S. PATENT DOCUMENTS

| 4,027,651 | 6/1977 | Robbins, Jr. | 126/425 |
| 4,044,752 | 8/1977 | Barak | 126/425 |
| 4,055,161 | 10/1977 | Jones | 126/425 |
| 4,063,543 | 12/1977 | Hedger | 126/425 |
| 4,158,356 | 6/1979 | Wininger | 126/425 |
| 4,159,710 | 7/1979 | Prast | 126/425 |

Primary Examiner—James C. Yeung
Attorney, Agent, or Firm—DeLio and Montgomery

[57] ABSTRACT

This invention relates to temperature differential sensing means particularly suitable for sensing temperatures at respective opposite sides of a heat shield whereby alignment of the shield with respect to a heat source may be monitored so as to enable the shield to be maintained in operative aligned relationship with the heat source.

13 Claims, 6 Drawing Figures

HEAT SENSING MEANS, PARTICULARLY FOR SOLAR WATER HEATING APPARATUS

This invention relates to temperature sensing apparatus particularly suitable for apparatus for tracking a heat source and to applications thereof.

There are many applications where it is desirable to maintain an assembly in operative alignment with a heat source and to date the means by which such heat source tracking was accomplished required the use of complex equipment whereby its application was expensive and limited to specialised fields.

In one aspect, the present invention aims to provide heat source tracking means which will be of simple and robust construction and reliable and efficient in operation.

A typical example where heat source tracking means would benefit current commercial apparatus but is not applied because of cost limitations, is solar water heating apparatus, and in order to illustrate the present invention, particular reference will be made herein to the invention applied to solar water heating apparatus. Of course, the invention is not limited to such applications, and it may be embodied in many forms to suit various applications, such as in sensing and controlling temperature in two or more holding tanks to maintain a controlled temperature balance. In its basic form, the tracking apparatus embodying the present invention does not utilise any electrical or electronic equipment but, of course, such equipment may be utilised for various specialised applications.

At present, most domestic solar water heating apparatus comprises a fixed absorber adapted to be roof mounted to face the sun and co-operating with a hot water storage tank. The hot water passes to the storage tank by natural convection means as the water is heated in the absorber, and cold water returns to the absorber. Such solar heating apparatus is not particularly efficient for several reasons. As natural convection is utilised to circulate the hot water from the absorber to the tank, reverse convection operates during the night and circulates the heated water from the tank through the absorber and stored heat is dissipated to the colder atmosphere.

More importantly, during the hours of sunshine, the absorber is not at all times arranged square to the sun's rays so that it is only during the middle of the day that the absorber operates at maximum capacity. During the early hours of sunshine and the last hours of sunshine the absorber is positioned obliquely to the sun's rays so that the effective area of heat absorption is greatly reduced and the heating effect of the absorber is reduced.

The present invention provides means whereby the above disadvantages may be efficiently overcome. Other objects and advantages of the invention will become apparent from the following description.

With the foregoing and other objects in view, this invention resides broadly in apparatus for detecting temperature differences between two locations, said apparatus including a pair of sealed fluid chambers each adapted to be disposed at a respective one said location and each being in fluid communication with a respective pressure responsive actuator having an operating member movable in response to pressure changes in the respective fluid chamber, and said operating members being coupled for corresponding movement one with the other, and there being provided detecting means co-operating with said operating members to detect movement of the latter consequent to variations in temperature between said two locations.

According to another aspect, the invention resides in a method of maintaining a receiving assembly in operative aligned relationship with a heat source, comprising:

operatively arranging heat sensing means with respect to said receiving assembly so that heat from said heat source falling upon said sensing means varies with changes of alignment of said receiving assembly with respect to said heat source;

providing communication means operatively associated with said sensing means and adapted to relay the condition of said sensing means to actuating means associated with said receiving assembly; and arranging said actuating means to move said receiving assembly in a predetermined manner according to the condition of said sensing means so as to maintain operative alignment of said receiving assembly with said heat source.

According to another aspect, the receiving assembly is constituted by an absorber of solar water heating apparatus comprising said absorber and a storage tank and wherein said absorber comprises a reflector having a focal axis along which is supported a gas evacuated tube part filled with water and extending past said reflector into said hot water storage tank to transfer solar heat to said storage tank.

In order that the invention may be more readily understood and put into practical effect, reference will now be made to the accompanying drawings which illustrate the invention, as applied to a preferred form of solar water heating apparatus, and wherein:

FIG. 5 is a plan view of a preferred form of valve for use with the present invention; and FIG. 6 is a cross-sectional view of the valve taken along the line 6—6 of FIG. 5.

This invention provides temperature differential sensing means adapted to maintain a heat absorber or other member in operative aligned relationship with respect to a heat source. For example, the invention may be utilized to maintain a solar absorber or reflector square or at a predetermined angle to the sun's rays so that maximum heat absorption or reflection can be achieved at all times per unit area of absorber.

Basically, the tracking means according to the present invention utilizes heat sensing means which may be monitored to energize actuating means for the assembly to maintain the assembly in operative aligned relationship with respect to the heat source.

Figure 1:
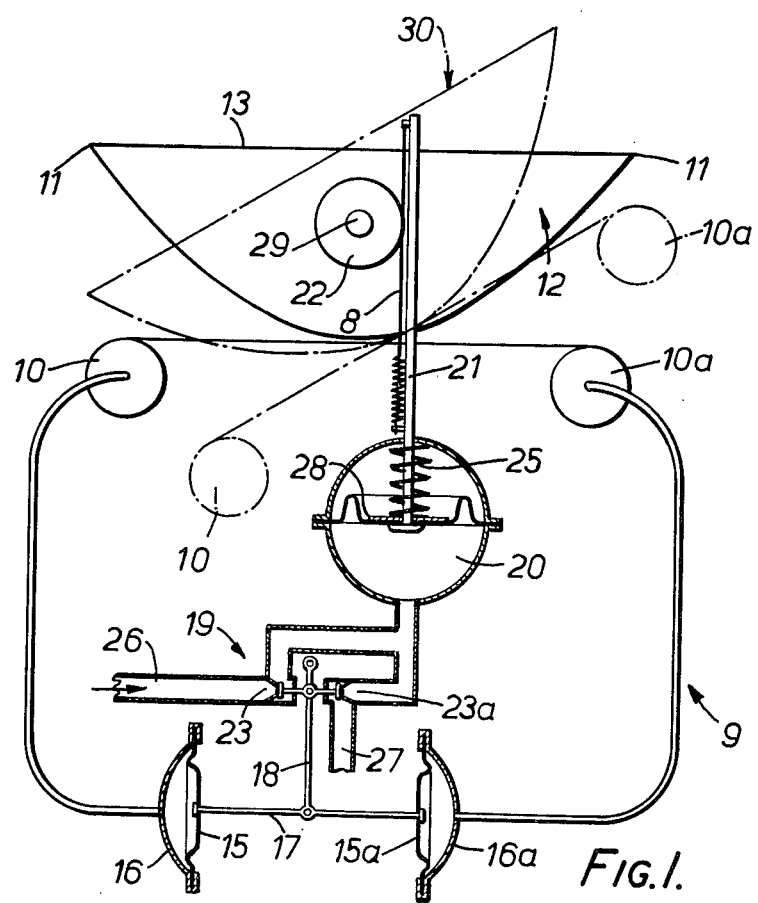
FIG. 1 is a schematic illustration of one form of heat source tracking means according to the present invention.

The tracking means 9 illustrated diagrammatically in FIG. 1 is utilized to pivot a heat absorber in the east-west direction during the course of a day to maintain the absorber square to the sun's rays for maximum heat absorption, and then return the absorber to its easterly directed attitude as the sun rises on the next day. Of course, the tracking means may be simplified should it be utilized to track a heat source which moves along a fixed path in one direction and, of course, conversely it may be enlarged to maintain operative alignment in the east-west direction as well as operative alignment in the north-south direction. As shown, the tracking means 9 comprise a pair of fluid chambers 10 and 10a suitably air chambers, supported behind the respective opposite east-west side edges 11 of the heat absorber 12 which is pivotable about a substantially north-south axis whereby the heat receiving face 13 of the absorber 12 may be pivoted to maintain it square to the rays from the heat of the sun, illustrated diagrammatically at 14.

The chambers 10 and 10a are sealed and communicate with respective pressure sensitive pilot actuators 16 and 16a having diaphragm type operating members 15 and 15a which are interconnected by a connecting rod 17, whereby one is balanced against the other. This ensures that the diaphragms 15 and 15a move only in response to changes in temperatures between the air chambers and not variations in ambient temperatures. Of course, the diaphragms will move in response to variations in temperatures between the air chambers irrespective of the ambient temperature. The control rod 17 is connected centrally to the actuating lever 18 of a three-way valve assembly 19 which is adapted to admit or drain fluid from the servo actuator 20 which has a push rod 21 connected by means of a spring tensioned cable 8 to a wheel 22 fixed to the absorber 12 concentrically about its pivot axis. The cable 8 passes about the wheel so that movement of the push rod 21 will cause corresponding movement of the absorber about its support axis in the east-west direction.

When the absorber 12 is operatively aligned with the sun 14 both air chambers 10 and 10a are shielded from the sun and thus both are maintained at ambient temperature so that there will be no pressure differential within the respective pilot actuators 16 and 16a. When, say, the sun is in the east and the air chamber 10 is not shielded by the absorber 12 that chamber 10 will absorb heat by direct radiation. The pressure within the chamber 10 will increase and as there will then exist an imbalance between the pilot actuators the diaphragm 15 will move the connecting rod 17 to the right to open the valve means 23 which is spring biased to the closed position. This valve means 23 admits water under pressure to the servo actuator 20 which, in this embodiment, is a diaphragm device having the push rod 21 connected centrally to the diaphragm 28 so that the absorber 12 will pivot about its north-south axis 29.

The absorber 12, together with the air chambers 10 and 10a mounted thereon will be pivoted until the assembly is in the position 30 illustrated in dotted outline. In this position, both air chambers 10 and 10a will be shielded from the sun so that the pressures in the pilot actuators 16 and 16a will be equalized whereupon the connecting rod 17, the control lever 18 and the valve means 23 will be returned to their normal position. In this position, both valve means 23 and 23a are spring-urged closed so that the servo actuator 20 will maintain the absorber 12 in its operatively aligned attitude square to the sun's rays. When the sun moves to the west, the air chamber 10a will be exposed to the sun and the resultant increase in pressure will cause the connecting rod 17 to move to the left and open the valve means 23a to enable water to drain from the actuator 20. For this purpose, the diaphragm 28 is spring loaded by the spring 25 to cause the push rod 21 to retract and pivot the absorber 12 in the opposite direction until both chambers 10 and 10a are again shielded from the sun. Of course, in use, the movement will be continuous so that water is slowly drained from the servo actuator 20 during the day to maintain the operative alignment of the absorber 20.

The three-way valve 19 is shown in FIGS. 5 and 6. Water under pressure, as from the mains supply, is fed to the inlet 26 and the outlet 27 acts as a drain. The inlet 26 and the outlet 27 are both normally closed by spring loaded valve means 23 and 23a respectively to prevent communication with the hollow interior of the valve body 31 which connects with the servo actuator 20 through the connector 31a while the opposite end of the body 31 supports the control lever 18, the inner end of which passes sealably into the body 31 to co-act operatively with the respective valve members 32 so that either may be lifted from its respective seat to open the valve means 23 or 23a. The body is also provided with a pressure relief valve 33.

Figure 2:
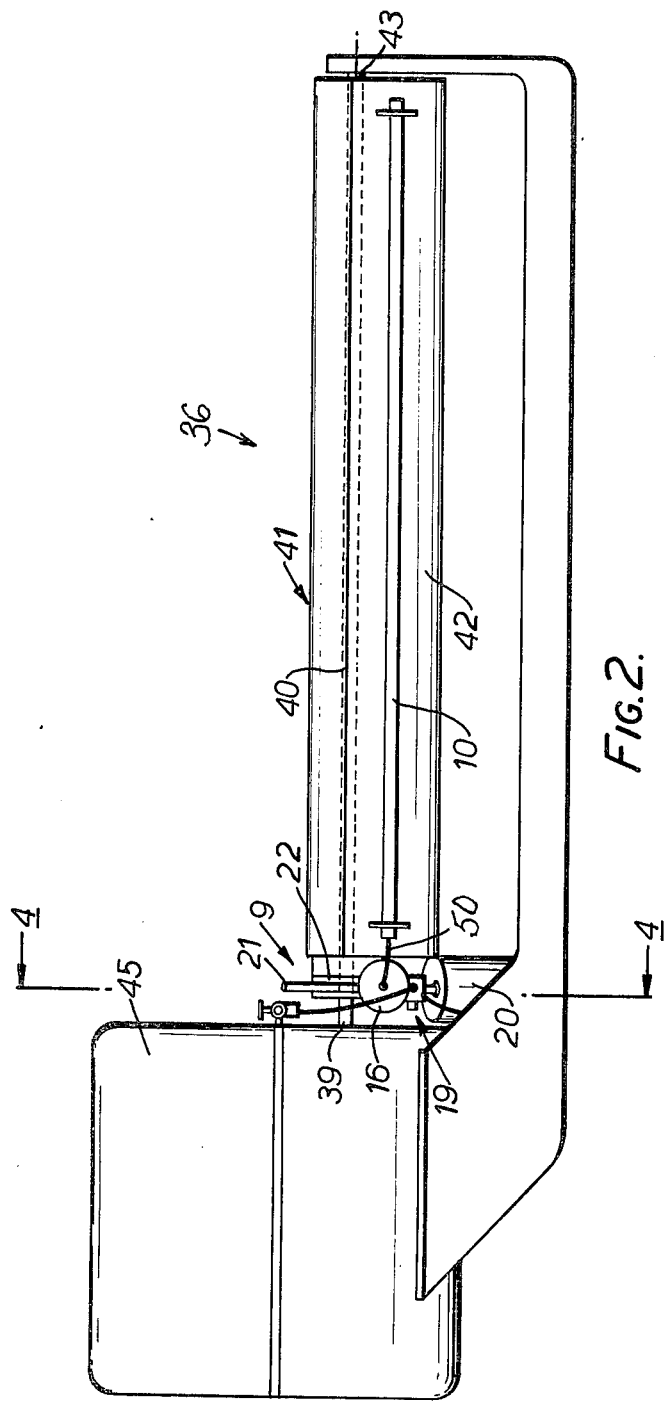
FIG. 2 is a side elevational view of solar water heating apparatus according to the present invention.
Figure 3:
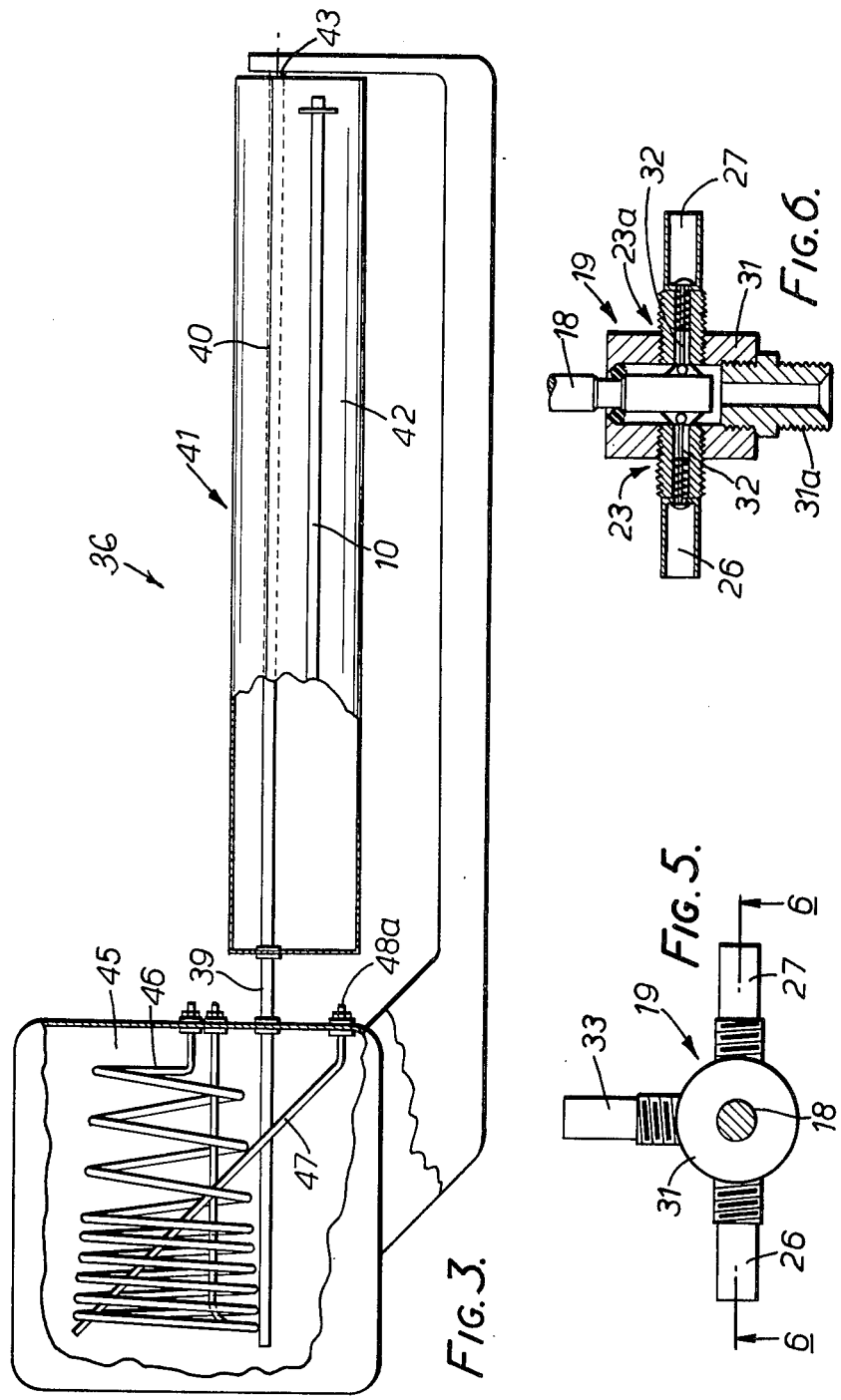
FIG. 3 is a view similar to FIG. 2, but partly broken away to show the water heating circuit.
Figure 4:
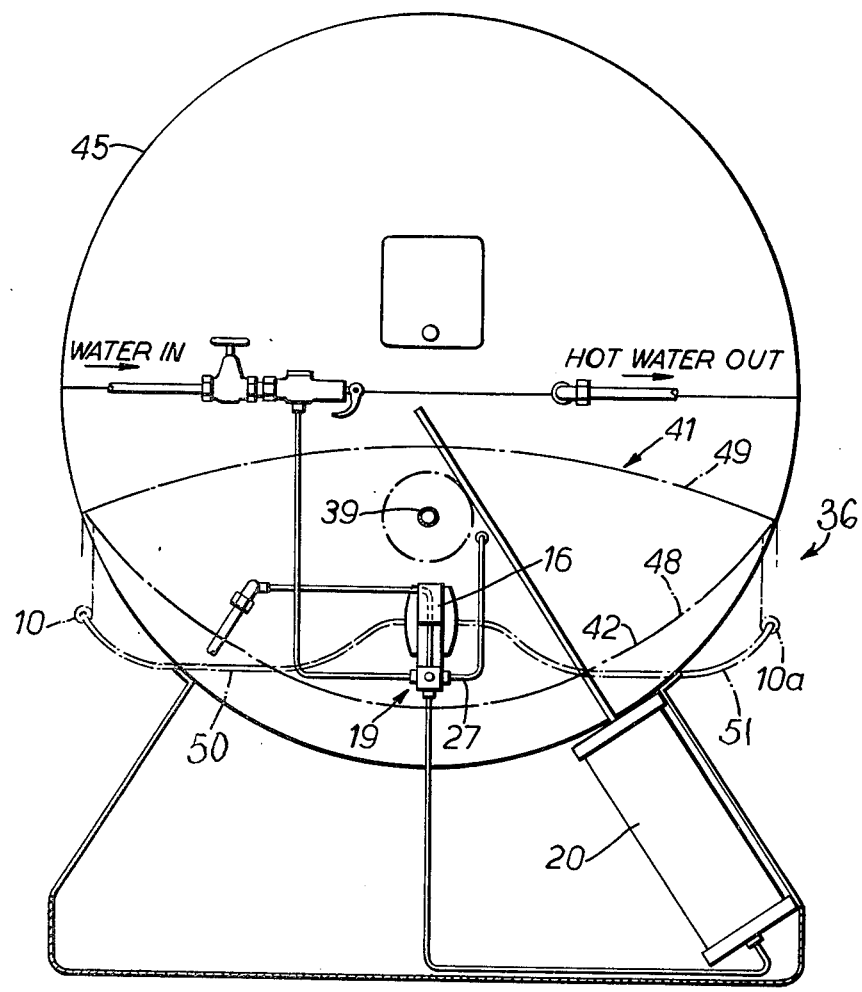
FIG. 4 is an end view of the apparatus along the line 4—4 of FIG. 2.

The heat source tracking means 9 described above is utilized in the solar water heating apparatus 36 illustrated in FIGS. 2 to 4 herewith. In this apparatus 36, the air chambers 10 and 10a are arranged behind the respective east-west side edges 40 of an elongate parabolic reflector assembly 41 in which the arcuate base 42 is adapted to reflect the sun's rays towards the focal axis of the parabolic reflector and which is coincident with the longitudinal axle 43 about which reflector assembly 41 is mounted and which is adapted to lie in the north-south direction and be inclined for operative alignment with the latitude of the sun. The tilt of the absorber can be controlled by the use of additional tracking means to adjust for variations of latitude during different seasons, but this is not normally necessary. The axle 43 in this embodiment is in the form of a sealed copper heating tube 39 partly filled with water and evacuated and adapted to extend beyond the upper end 44 of the reflector into the storage tank 45.

The storage tank 45 acts as a heat storage medium in which a heat exchanger is provided in the form of an internal coil 46 to supply heat to water as it passes through the coil in the storage tank 45. This system provides a high pressure hot water supply without the need to provide a high pressure storage tank.

As mentioned earlier, the heating tube 39 contains a small quantity of water and the air is evacuated from the tube so that water in the tube will boil at a very low temperature of about one hundred degrees Fahrenheit or even less. As the water boils, the steam created will flow rapidly to the lowest pressure area inside the tube, which corresponds to the coldest part of the tube, and which is of course the portion of the tube 39 within the storage tank 45. At this point, the steam recondenses into water giving up its latent heat to the water in the storage tank in the process. The condensate runs back down the heat tube 39 to replenish the water. The transfer of heat from the heat tube to the storage tank is a continuous operation and in operation the steam in fact passes through the heat tube 39 at supersonic speeds due to the lack of air resistance. Not only is the resultant heat transfer extremely efficient, but also at night when the unit is not operating, all the water in the heat tube 39 is contained at the bottom of the tube 39 so that there is no heat loss through reverse convection as in the conventional solar water heaters.

The reflector assembly 41 pivots about the heat tube 39 which is at the focal axis of the reflector 42 which is maintained square to the direction of the sun's radiation by tracking means 9 as described with reference to FIG. 1. In this embodiment, the three-way valve 19 is mounted beneath the pilot actuators 16 connected operatively to the respective air chambers 10 and 10a by the tubes 50 and 51. The servo actuator 20 is in the form of a cylinder and ram assembly and the outlet connection 27 from the three-way valve 19 is fed into the storage tank 45 to compensate for water loss through evaporation. Furthermore, the overflow tube 47 passes down through the tank 45 so that the heat of the overflowing water is absorbed by the colder water at the bottom of the tank prior to being discharged at 48a. The reflective surface 48 of the reflector 41 is formed of an acrylic mirror and a clear arcuate acrylic cover 49 is provided over the reflector 41.

The servo actuator can take many forms, for example, a bladder can be used in lieu of the diaphragm actuator or the ram assembly. Furthermore, other variations include a tank and float, or the use of gas for operating the above devices. The air chambers may be connected to a mercury switch in which mercury is pushed one way or the other to actuate electrical control equipment, or the same can be achieved by using a diaphragm system. The air chamber could be interconnected to two dividing bells on a see-saw inverted in a fluid so that greater or lesser pressure in one raises or lowers one side to convert the temperature variance to mechanical motion. The air or gas filled chambers alternatively can be arranged to exert pressure on a chamber or other container on a balance so that fluid is transferred tipping the balance one way or the other.

Also, a single sensing means may be utilised to move an absorber or other directional device in a predetermined manner. For example, if an absorber were set operatively aligned to the rising sun and spring loaded to the west, a single sensing means could be utilized to control movement of the absorber in the east-west direction. However, other control apparatus would be required to reset the apparatus in its easterly heading.

The heat sensing means of the present invention could be utilized in automatic heat seeking fire fighting installations or for opening or closing shutters or the like to control temperatures within a building. Furthermore, it could be utilised to control reflectors for say the production of energy from the sun or for obtaining maximum natural lighting within a building. Furthermore, it is appreciated that many types of pressure responsive actuators may be used in lieu of diaphragm actuators. In an alternate form, each fluid chamber communicates with one side of a sealed housing divided internally by a single diaphragm. This eliminates the mechanical coupling of the diaphragms. However, the detecting means has to sealably extend into the housing to co-operate with the single diaphragm.

It will of course be realized that while the above described embodiments have been given by way of illustrative example, many modifications of constructional detail and design may be made to these embodiments by persons skilled in art, such as by causing the pilot actuators each to operate the servo actuators positively in respective opposite directions. All such modifications and variations fall within the scope and ambit of the invention as is defined in the appended claims.

We claim:

1. Apparatus for tracking a movable heat source comprising:

a movable heat-receiving body pivotted about a support axis so as to track the movable heat source, a pair of sealed fluid chambers supported by the heat-receiving body for movement therewith, said fluid chambers being spaced apart and so located that when the heat-receiving body is operatively aligned with the heat source the fluid chambers are correspondingly shielded from the heat source and when the heat-receiving body is not operatively aligned with the heat source one of the fluid chambers is exposed to the heat source more than the other fluid chamber, means for coupling each fluid chamber to a respective pressure responsive actuator having an operating member movable in response to pressure changes in the respective fluid chamber, said operating members being coupled for corresponding movement one with the other, movement detecting means co-operating with said operating members to detect movement of the latter consequent to variations in temperature between the two fluid chambers arising from unequal exposure of the fluid chambers to the heat source, and driving means operatively connected to the heat-receiving body for pivotting the body about its support axis, the driving means being actuated by said movement detecting means whereby movement of said operating members in one direction causes actuation of the driving means in a forward direction and movement of said operating members in the opposite direction causes actuation of said driving means in the reverse direction.

2. The apparatus of claim 1, wherein said driving means comprises a fluid driven ram assembly adapted to be extended and retracted by means of a control valve assembly operatively connected to said detecting means.

3. The apparatus of claim 2 wherein a ram of said fluid driven ram assembly is spring urged to its retracted position and said control valve assembly is adapted to admit fluid to said fluid driven ram assembly to extend said ram and adapted to drain fluid from said fluid driven ram assembly to retract said ram.

4. The apparatus of claim 1 or 2 or 3 wherein there are provided two said driving means each adapted to control pivotal movement of said receiving means about a respective one axis of a pair of axes disposed at right angles to one another and each said driving means being responsive to a respective pair of said fluid chambers disposed at opposite sides of the respective axes.

5. The apparatus of claim 1 wherein said receiving means is constituted by an absorber of solar water heating apparatus comprising said absorber and a storage tank, and wherein said absorber comprises a reflector having a focal axis along which is supported a gas evacuated tube part filled with liquid and extending past said reflector into said hot water storage tank to transfer solar heat to said storage tank.

6. The apparatus of claim 5 wherein there is provided a heat exchange coil in said storage tank through which water may be passed for heating purposes.

7. A method of maintaining a receiving assembly in operative aligned relationship with a heat source comprising:

operatively supporting means for detecting temperature differences on said receiving assembly, said detecting means having a pair of sealed fluid chambers each being in fluid communication with a respective pressure responsive actuator with an operating member movable in response to pressure changes in the respective fluid chamber and being operatively supported in such manner that when said receiving assembly is operatively aligned with said heat source, said fluid chambers are correspondingly shielded from said heat source, and when said receiving assembly is not operatively aligned with said heat source one said fluid chamber is exposed to said heat source more than the said other fluid chamber;

providing a driving assembly adapted to be operatively connected to said receiving assembly to pivot the latter about a support axis and actuated by said detecting means whereby movement of said operating members in one direction causes actuation of said driving assembly in a forward direction and movement of said operating members in the opposite direction causes actuation of said driving assembly in the reverse direction.

8. A method according to claim 7, wherein said driving assembly is a fluid driven ram assembly adapted to be extended and retracted by means of a control valve assembly operatively connected to said detecting means.

9. A method according to claim 8, wherein the ram of said fluid driven ram assembly is spring urged to its retracted position and said control valve means is adapted to admit fluid to said fluid driven ram assembly to extend the ram and adapted to drain fluid from said fluid driven ram assembly to retract the ram.

10. A method according to claims 7 or 8 or 9, wherein there are provided two said driving assemblies each adapted to control pivotal movement of said receiving assembly about a respective one axis of a pair of axes disposed at right angles to one another and each said driving assembly being responsive to a respective pair of said fluid chambers disposed at opposite sides of the respective axes.

11. A method according to claim 7, wherein said receiving assembly is constituted by an absorber of solar water heating apparatus comprising said absorber and a storage tank, and wherein said absorber comprises a reflector having a focal axis along which is supported a gas evacuated tube part filled with liquid and extending past said reflector into said hot water storage tank to transfer solar heat to said storage tank.

12. A method according to claim 11, wherein there is provided a heat exchange coil in said storage tank through which water may be passed for heating purposes.

13. A method of maintaining a receiving assembly in operative aligned relationship with a heat source comprising:

operatively arranging heat sensing means with respect to said receiving assembly so that heat from said heat source falling upon said sensing means varies with changes of alignment of said receiving assembly with respect to said heat source;

providing communication means operatively associated with said sensing means and adapted to rely the condition of said sensing means to actuating means associated with said receiving assembly;

arranging said actuating means to move said receiving assembly in a predetermined manner according to the condition of said sensing means so as to maintain operative alignment of said receiving assembly with said heat source; and wherein said sensing means comprises a pair of fluid chambers supported behind respective opposite sides of a shield on said receiving assembly and said communication means being a pair of interconnected fluid operated devices each communicating operatively with a respective one of said fluid chambers and being adapted to control actuation of said actuating means which comprises a fluid driven ram connected to said receiving assembly to pivot same about a first axis and wherein one said fluid operated device is adapted to control extension valve means for the supply of operating fluid to said fluid driven ram to extend said ram and the other said fluid operated device is adapted to control retraction valve means for retracting said ram.

* * * * *